United States Patent [19]

Roland

[11] Patent Number: 4,720,526

[45] Date of Patent: Jan. 19, 1988

[54] CURED RUBBER COMPOSITIONS OF HIGH MODULUS

[75] Inventor: Charles M. Roland, Norton, Ohio

[73] Assignee: The Firestone Tire & Rubber Company, Akron, Ohio

[21] Appl. No.: 869,629

[22] Filed: Jun. 2, 1986

[51] Int. Cl.$^4$ .......................... C08F 4/00; C08F 275/00
[52] U.S. Cl. ..................... 525/273; 525/274; 525/281; 525/282; 524/521
[58] Field of Search ............... 525/273, 274, 281, 282; 524/399, 521

[56] References Cited

U.S. PATENT DOCUMENTS

| | | | |
|---|---|---|---|
| 4,056,269 | 11/1977 | Pollitt et al. | 524/432 |
| 4,065,537 | 12/1977 | Miller et al. | 524/432 |
| 4,165,877 | 8/1979 | Miller et al. | 260/998.14 |
| 4,191,671 | 3/1980 | Kataoka et al. | 524/571 |
| 4,264,075 | 4/1981 | Miller et al. | 260/998.14 |
| 4,266,772 | 5/1981 | Martin et al. | 260/998.14 |
| 4,305,851 | 12/1981 | Tominaga et al. | 260/998.14 |
| 4,500,466 | 2/1985 | Hayes et al. | 524/533 |
| 4,529,770 | 7/1985 | Hayes et al. | 524/533 |
| 4,546,980 | 10/1985 | Gendreau et al. | 525/274 |

OTHER PUBLICATIONS

Derwent Abs, 83-62914 K/26, Sumitomo Rubber Inc. KK, 5-1983 (J58087140).
Derwent Abs, 83-745261/34, Zhuravleva G. A. et al, S.U. 966097 (10-1982).

*Primary Examiner*—Herbert J. Lilling
*Attorney, Agent, or Firm*—Frank J. Troy, Sr.

[57] ABSTRACT

Cured rubber compositions having modulii at 10% elongation of from about 50 MPa to about 200 MPa are prepared by curing, curable rubber compositions comprising: (a) 100 parts by weight of a rubber selected from the group consisting of natural rubber, nitrile rubber, neoprene and blends thereof; (b) from about 50 to about 100 parts by weight of a metal dimethacrylate selected from the group consisting of zinc dimethacrylate and magnesium dimethacrylate and (c) from about 1.0 to about 6.0 parts by weight of a peroxide curing agent; at temperatures ranging from about 140° to about 180° C. for time periods ranging from about 10 to about 45 minutes. The curable rubber compositions may optionally and in some instances preferably contain from about 0.1 to about 2.0 parts by weight of a co-curing agent.

Cured rubber compositions of the invention may be utilized in various applications including for example conveyor belts and tire compounds.

16 Claims, No Drawings

CURED RUBBER COMPOSITIONS OF HIGH MODULUS

BACKGROUND OF THE INVENTION

The invention relates to cured rubber compositions having high modulii at low strain. More particularly, the invention relates to cured rubber compositions having modulii at 10% elongation of from about 50 MPa to about 200 MPa which are formed by curing, under specified temperature and time conditions, curable rubber compositions comprising a rubber selected from natural rubber, nitrile rubber, neoprene and blends thereof; a metal dimethacrylate selected from zinc dimethacrylate and magnesium dimethacrylate and a peroxide curing agent and optionally, a co-curing agent.

Conventional cured rubber compositions normally exhibit excellent flexibility and extensibility having elongations at break of 200% or greater. Unfortunately, however, such compositions also normally exhibit low modulus values at low strains. Thus, such compositions typically have modulus values at 10% elongation of less than about 10 MPa, more commonly about 5 MPa or less. On the other hand, cured polymeric compositions which exhibit high modulus values at 10% elongation normally have low elongations at break and are therefore brittle like plastics.

Cured rubber compositions having high modulii at low strain and good extensibility would have significant advantages in certain applications such as, for example, tire compounds. Accordingly, a need for such compositions exists.

Curable rubber compositions containing various rubbery polymers, metal acrylates or metal methacrylates including basic zinc methacrylate and zinc dimethacrylate and peroxide curing agents and certain cured products formed from such compositions are known in the art as illustrated by the following patents.

U.S. Pat. No. 4,056,269 to Pollitt et al. relates to molding compositions suitable for forming molded golf balls containing cis-polybutadiene or other undefined elastomers, a metal-containing crosslinking monomer and a peroxide initiator. A wide variety of metal-containing crosslinking monomers are disclosed in columns 2 and 3 of the patent including zinc diacrylate, zinc dimethacrylate and magnesium dimethacrylate. The patent, at column 4 lines 3-14, teaches that the amount of the metal-containing crosslinking monomer should correspond to at least about 0.046 equivalents of polymerizable unsaturation per mole of butadiene in the elastomer base, but may be as high as 0.41 equivalents per mole, which when converted to a parts by weight basis indicates a range of from about 9 to 90 parts by weight of the crosslinking monomer per 100 parts by weight of cis-polybutadiene. The reference further teaches that if the crosslinking monomer selected is zinc dimethacrylate, the more preferable amounts are in the range of about 20 to 50 parts per 100 parts of elastomer. The peroxide initiator may be present in amounts of about 0.2-10% by weight of the elastomer. The reference additionally discloses that molding temperatures may range between 130° and 200° C. and curing times may range from 1 to 50 minutes.

U.S. Pat. No. 4,065,537 to Miller et al. relates to a process for producing molded golf balls exhibiting isometric compression which involves the use of cylindrical slugs about 2.5 to 3.3 inches long having substantially flat or convex top and bottom surfaces during the molding process. Molding compositions for forming such slugs are disclosed which contain cis-polybutadiene or other elastomers, a metal-containing crosslinking monomer and a peroxide initiator. A wide variety of metal-containing crosslinking monomers are disclosed including zinc dimethacrylate and magnesium dimethacrylate. The compositions disclosed are basically the same as those described in U.S. Pat. No. 4,056,269 above with the exception that the preferred amounts of metal-containing crosslinking monomer, especially when said monomer is zinc dimethacrylate, are stated as ranging from about 15 to 60 parts per 100 parts of cis-polybutadiene. Curing conditions disclosed are the same as set forth in the aforementioned patent.

U.S. Pat. No. 4,082,288 to Martin et al. discloses free-radical crosslinkable compositions containing a peroxide crosslinkable elastomer, from about 10 to about 60 parts by weight per 100 parts by weight of elastomer of basic zinc methacrylate and a peroxide curing agent. The examples of the patent indicate that the compositions are cured at 300° F. (148.9° C.) for 20 minutes.

U.S. Pat. No. 4,191,671 to Kataoka et al. relates to abrasion resistant rubber compositions which are prepared by curing rubber compositions comprising: (A) a diene elastomer, (B) an alpha-beta ethylenically unsaturated carboxylic acid, wherein the ratio by weight of component (A) to component (B) is 87/13 to 55/45, (C) a divalent metal compound being present in quantities of 50 to 150 parts by weight per 100 parts by weight of component (B), and (D) an organic peroxide being present in quantities of 0.3 to 5.0 parts by weight per 100 parts by weight of the combined weight of components (A) and (B). The compositions may additionally contain an unpolymerizable carboxylic acid, carbon black in amounts of less than 50 parts by weight per 100 parts by weight of elastomer and an amine and/or phenol compound. The patent broadly discloses curing temperatures ranging from 110°-180° C. while the examples thereof exemplify curing temperatures ranging from 120° to 140° C. and curing times ranging from 30 minutes to 60 minutes.

U.S. Pat. No. 4,264,075 to Miller et al., relates to a two-piece molded golf ball consisting of a cover comprising an ionic copolymer and a center part formed from a molding composition containing cis-polybutadiene or other elastomers, a metal-containing crosslinking monomer and a peroxide initiator. A wide variety of such crosslinking monomers are disclosed including zinc dimethacrylate and magnesium dimethacrylate. The molding compositions used to form the center part of the golf ball are substantially the same as those described in U.S. Pat. Nos. 4,056,269 and 4,065,537 above with the exception that lower quantities of crosslinking monomer are preferred, i.e. from 15 to 35 parts per 100 parts of cis-polybutadiene. Molding temperatures disclosed in the patent may range between 140° C. and 200° C., advantageously about 150° to 190° C., preferably 170° to 185° C. and curing times may range from about 50 to 1 minutes, advantageously from 30 to 5 minutes and preferably about 20 to 10 minutes.

U.S. Pat. No. 4,266,772 to Martin et al. relates to solid golf balls formed from a curable elastomer composition comprising a free radical crosslinkable elastomer, especially a peroxide crosslinkable elastomer; from about 10 to about 60 parts by weight of a zinc oxide-methacrylic acid reaction product, preferably basic zinc methacrylate, per 100 parts by weight of elastomer and a curing agent such as a peroxide curing agent. Curing conditions set forth in the examples are 20 minutes at 300° F. (148.9° C.).

U.S. Pat. No. 4,305,851 to Tominaga et al. relates to a process for preparing a solid golf ball which comprises incorporating a microencapsulated zinc salt of an allyl group containing carboxylic acid as a crosslinking agent into a rubber along with a peroxide curing agent and other additives to produce a rubber composition, following which the rubber composition is molded. The patent at column 5, Table I discloses several polybutadiene rubber compounds containing microencapsulated zinc dimethacrylate and peroxide curing agents with the zinc dimethacrylate being present in amounts of 42 and 50 parts respectively. The compositions are cured for 30 minutes at 150° C.

U.S. Pat. No. 4,500,466 to Hayes et al. relates to a method of preparing a zinc dimethacrylate adjuvant of high surface area and to vulcanizable polymeric compositions containing the adjuvant. Vulcanizable polymeric compositions which are disclosed comprise: (a) rubbery polymers selected from the group consisting of natural rubber, ethylene/propylene copolymers, ethylene/propylene/diene terpolymers, styrene/butadiene copolymers, nitrile rubbers, neoprene and blends thereof; (b) from about 25 to about 85 parts by weight of a zinc dimethacrylate powder having a surface area of from about 3.7 to about 5.4 $m^2/g$ or more per 100 parts by weight of said rubbery polymers; and (c) a cure effective amount of a peroxide curing agent. The specification discloses that the amount of peroxide generally used may range from about 0.2 to about 2.0 parts by weight. Example 20 of the patent discloses a composition containing 100 parts of natural rubber, 60 parts of zinc dimethacrylate and 1.0 parts of Vulcup R, i.e., bis-(t-butylperoxy) diisopropyl benezene. As shown in Table IV, this composition when cured for 15 minutes at 160° C. exhibits a 10% modulus of 3.2 MPa. Example 21 discloses a composition containing 100 parts of natural rubber, 70 parts of zinc dimethacrylate and 1.0 parts of said peroxide curing agent. This composition when cured for 15 minutes at 160° C. exhibits a 10% modulus of 4.6 MPa.

SUMMARY OF THE INVENTION

In accordance with the present invention, cured rubber compositions having modulii at 10% elongation of from about 50 MPa to about 200 MPa are provided. Such compositions are formed by curing, a curable rubber composition comprising: (a) 100 parts by weight of a rubber selected from the group consisting of natural rubber, nitrile rubber, neoprene and blends thereof; (b) from about 50 to about 100 parts by weight of a metal dimethacrylate selected from the group consisting of zinc dimethacrylate and magnesium dimethacrylate and (c) from about 1.0 to about 6.0 parts by weight of a peroxide curing agent; at temperatures ranging from about 140° to about 180° C. for time periods ranging from about 10 to about 45 minutes. The curable rubber composition may additionally contain from about 0.1 to about 2.0 parts by weight of a co-curing agent.

The most surprising aspect of the invention is the discovery that these cured rubber compositions while having modulus value at 10% elongation as much as 40 times that of conventional rubbers also have good flexibility and extensibility and exhibit minimal permanent set. Permanent set refers to the non-recoverable deformation accompanying the elongation of a material. In addition, the rubber compositions of the invention prior to curing can be processed using conventional rubber equipment and procedures.

DETAILED DESCRIPTION OF THE INVENTION

Rubbers or rubbery polymers which may be employed in the compositions of the invention include natural rubber, nitrile rubber, neoprene and blends thereof.

Metal dimethacrylates employed in the compositions of the invention are selected from zinc dimethacrylate and magnesium dimethacrylate. The preferred metal dimethacrylate is zinc dimethacrylate.

The zinc dimethacrylate and magnesium dimethacrylate may be prepared by any known method. In general, the zinc dimethacrylate may be prepared by reacting with agitation zinc oxide and methacrylic acid in an amount of from about 0.5 to about 0.6 moles of zinc oxide per mole of methacrylic acid in a liquid medium (e.g. water or a volatile organic liquid such as a liquid hydrocarbon), recovering the resulting zinc dimethacrylate product from the liquid medium and then drying the product. The magnesium dimethacrylate can be prepared in similar manner by reacting magnesium hydroxide and methacrylic acid in an amount of from about 0.5 to about 0.6 moles of magnesium hydroxide per mole of methacrylic acid in the liquid medium. If desired, the zinc dimethacrylate and magnesium dimethacrylate may be finely divided to aid in dispersing the materials into the rubber.

A preferred method for preparing the zinc dimethacrylate is described in the above-mentioned U.S. Pat. No. 4,500,466 to Hayes et al. the disclosure of which is incorporated herein by reference. The method involves reacting with agitation zinc oxide and methacrylic acid in amounts of from about 0.5 to about 0.6 moles of zinc oxide per mole of methacrylic acid in a liquid aliphatic hydrocarbon (preferably an alkane, especially hexane), followed by recovery of the resultant zinc dimethacrylate from the liquid medium and drying thereof.

One important factor should be noted at this time. The Hayes et al. patent teaches that the surface area of the zinc dimethacrylate is an extremely important factor in the excellent properties obtained when the polymer compositions described therein are cured. In contrast, the surface area of the zinc dimethacrylate employed in the rubber compositions of applicants invention is not a critical factor in achieving the very high modulus values exhibited by applicants cured rubber compositions. Thus, applicant has found that zinc dimethacrylates having surface areas of 3.0 $m^2/g$ or slightly less produce desirable results when incorporated in his compositions. It is believed that the high modulus values at 10% elongation exhibited by applicants cured compositions are basically attributable to the conditions under which applicants compositions are cured.

Alternatively, the zinc dimethacrylate or magnesium dimethacrylate utilized in the compositions of the invention may be formed in-situ, although this method is less desirable. Thus, the zinc dimethacrylate may be formed in-situ by separately mixing the zinc oxide and methacrylic acid with the rubber and the magnesium dimethacrylate may be formed in-situ by separately mixing the magnesium hydroxide and methacrylic acid with the rubber.

Amounts of metal dimethacrylate, i.e. zinc dimethacrylate, or magnesium dimethacrylate employed in the compositions of the invention may range from about 50 to about 100 parts by weight of rubber with preferred amounts ranging from about 60 to about 70 parts by weight per 100 parts by weight of rubber.

Peroxide curing agents which may be employed in the compositions of the invention include organic peroxides such as dicumyl peroxide, bis-(t-butyl peroxy) diisopropyl benzene, t-butyl perbenzoate, di-t-butyl peroxide, 2,5-dimethyl-2,5-di-t-butyl peroxy hexane and the like. The preferred peroxide curing agents are bis-(t-butyl peroxy) diisopropyl benzene and dicumyl peroxide.

Amounts of peroxide curing agents utilized in the compositions will depend upon the type rubber employed and may broadly be stated as cure effective amounts. In general, such amounts may range from about 1.0 to about 6.0 parts by weight of peroxide per 100 parts by weight of rubber. Preferred amounts of peroxide curing agent may range from about 2.0 to about 5.0 parts by weight per 100 parts by weight of rubber.

As indicated above, a co-curing agent may be included in the curable rubber compositions from which the cured rubber compositions of the invention are formed. In general, any co-curing agent which increases the utilization efficiency of the peroxide curing agent may be employed. Suitable co-curing agents which may be employed include N,N'-metaphenylenedimaleimide, triallyl isocyanurate and the like. Mixtures of such co-curing agents may also be utilized.

Amounts of co-curing agents employed in the compositions may range from about 0.1 to about 2.0 parts by weight per 100 parts by weight of rubber. Preferred amounts may range from about 0.5 to about 1.0 parts by weight per 100 parts by weight of rubber.

The curable rubber compositions may optionally contain other conventional additives which are commonly employed in rubber compositions. Such additives may include small amounts of fillers such as clays, silicas, calcium carbonate and the like; process and extender oils; processing aids such as zinc stearate, sodium dodecyl sulfate and the like; viscosity reduction agents such as aliphatic hydrocarbon resins, antioxidants, waxes, plasticizers and the like. Such additives may be utilized in amounts conventionally used in standard rubber compounds.

The curable rubber compositions may be mixed by any conventional mixing procedure such as, for example, by mixing the ingredients in an internal mixer such as a Banbury mixer or Brabender Plasticorder or on a mill. The rubber compositions depending on their intended use may be sheeted off on a rubber mill, calendared or extruded.

The conditions utilized in curing the curable rubber compositions are critical in order to obtain the very high modulus values of 10% elongation which are exhibited by the cured rubber compositions of the invention. The specific cure times and temperatures are related to the specific amounts of curing agents which are employed. Thus, the curable rubber compositions must be cured at temperatures ranging from about 140° to about 180° C., preferably from 150° to 160° C., for time periods ranging from about 10 to about 45 minutes, preferably from 25 to 35 minutes. It should be understood that at higher curing temperatures shorter curing times are used whereas at lower curing temperatures longer curing times are required.

An important fact should be noted with regard to the above curative levels and curing conditions. One skilled in the rubber compounding art would consider that such curing conditions would result in a significant overcure of the compositions. As is well known in the rubber compounding art, overcuring of rubber compounds normally results in significant degradation of physical properties, particularly strength properties. However, it was surprising and unexpected to find that the cured rubber compositions of the invention retained excellent tensile strength properties as shown by the examples which follow.

The following examples are submitted for the purpose of further illustrating the nature of the present invention and are not to be regarded as a limitation on the scope thereof. Parts and percentages referred to in the examples and throughout the specification are by weight unless otherwise indicated.

EXAMPLES 1-2

In these examples, cured rubber compositions of the invention were prepared from curable rubber compositions containing Hevea natural rubber (NR), zinc dimethacrylate and peroxide curing agent. The curable rubber compositions had the following formulations:

|  | Parts by weight | |
| --- | --- | --- |
| Ex. No. | 1 | 2 |
| Ingredients | | |
| NR | 100.0 | 100.0 |
| Zinc dimethacrylate[a] | 70.0 | 60.0 |
| Cyrez 963 resin[b] | — | 5.0 |
| Piccopale 100 resin[c] | — | 5.0 |
| Zinc Stearate | 2.0 | — |
| Vulcup R[d] | 2.0 | 1.5 |
| Total | 174.0 | 171.5 |

[a] prepared in accordance with the method described in U.S. Pat. No. 4,500,466
[b] hexamethoxymethyl melamine resin available from American Cyanamid Company
[c] aliphatic hydrocarbon resin available from Hercules, Inc.
[d] bis-(t-butylperoxy) diisopropyl benzene The above formulations were mixed in a Brabender Plasticorder. The mixed formulations were then cured and tested for stress-strain properties. Curing conditions, test conditions and stress-strain properties are shown in Table I.

TABLE I

|  | Ex. No. | |
| --- | --- | --- |
|  | 1 | 2 |
| Cure Time (minutes) | 28 | 28 |
| Cure Temperature, °C. | 160 | 160 |
| Stress-Strain at 23° C. | | |
| 10% modulus, MPa | 78.6 | 58.8 |
| Tensile, MPa | 15.1 | 22.9 |
| Elongation at break, % | 125 | 135 |

*MPa is an abbreviation for mega pascals

EXAMPLES 3-5

These examples illustrate cured rubber compositions of the invention prepared from curable rubber compositions containing NR, zinc dimethacrylate, peroxide curing agent and a co-curing agent. The curable rubber compositions had the following formulations:

|  | Parts by weight | | |
| --- | --- | --- | --- |
| Ex. No. | 3 | 4 | 5 |
| Ingredients | | | |
| NR | 100.0 | 100.0 | 100.0 |
| Zinc dimethacrylate | 70.0 | 70.0 | 90.0 |
| sodium dodecyl sulfate | 2.0 | 2.0 | 2.0 |
| piccopale 100 resin | — | 5.0 | — |
| Vulcup R (peroxide) | 1.5 | 2.0 | 1.5 |
| HVA-2 (co-curing agent)* | 1.5 | 1.5 | 1.5 |
| Total | 175.0 | 180.5 | 195.0 |

*N,N'—meta-phenylenedimaleimide

The above formulations were mixed, cured and tested for stress-strain properties as in Examples 1-2. Curing conditions, test conditions and properties are shown in Table II.

TABLE II

|  | Ex. No. | | |
| --- | --- | --- | --- |
|  | 3 | 4 | 5 |
| Cure Time, Min. | 32 | 32 | 32 |
| Cure Temp., °C. | 160° C. | 160° C. | 160° C. |
| Stress-Strain at 23° C. | | | |
| 10% modulus, MPa | 87.8 | 89 | 153 |
| Tensile, MPa | 16.5 | 16.8 | 16.2 |
| Elongation at break, % | 114 | 110 | 46 |

EXAMPLE 6

This example illustrates cured rubber compositions of the invention prepared from a curable rubber composition containing natural rubber, magnesium dimethacrylate, peroxide curing agent and a co-curing agent. The curable rubber composition had the following formulations:

| Ingredients | Parts by weight |
| --- | --- |
| NR | 100.0 |
| Magnesuim dimethacrylate | 70.0 |
| Sodium dodecyl sulfate | 2.0 |
| Vulcup R | 1.5 |
| HVA-2 | 1.5 |
| Total | 175.0 |

The above formulation was mixed, cured and tested for stress-strain properties as in Examples 1-2. Curing conditions, test conditions and properties are shown in Table III.

TABLE III

| Cure Time, Min. | 32 |
| --- | --- |
| Cure Temp, °C. | 160 |
| Stress-Strain at 23° C. | |
| 10% Modulus, MPa | 69.7 |
| Tensile, MPa | 13.0 |
| Elongation at break, % | 105 |

EXAMPLES 7-9

These examples illustrate cured rubber compositions of the invention prepared from curable rubber compositions containing nitrile rubber, zinc dimethacrylate and peroxide curing agent. The curable rubber compositions had the following formulations:

|  | Parts by weight | | |
| --- | --- | --- | --- |
| Ex. No. | 7 | 8 | 9 |
| Ingredients | | | |
| nitrile rubber (30% ACN)* | 100.0 | — | 100.0 |
| nitrile rubber (50% ACN)** | — | 100.0 | — |
| Zinc dimethacrylate | 70.0 | 70.0 | 60.0 |
| Vulcup R | 2.0 | 2.0 | 1.5 |
| Total | 172.0 | 172.0 | 161.5 |

*nitrile rubber containing 30% acrylonitrile
**nitrile rubber containing 50% acrylonitrile The above formulations were mixed, cured and tested for stress-strain properties as in Examples 1-2. Curing conditions, test conditions and properties are shown in Table IV.

TABLE IV

|  | Ex. No. | | |
| --- | --- | --- | --- |
|  | 7 | 8 | 9 |
| Cure Time, Min. | 48 | 40 | 48 |
| Cure Temp., °C. | 160° C. | 160° C. | 160° C. |
| Stress-Strain at 23° C. | | | |
| 10% Modulus, MPa | 93 | 170 | 84 |
| Tensile, MPa | 19.4 | 35.3 | 27.4 |
| Elongation at break, % | 120 | 130 | 260 |

EXAMPLE 10

This example illustrates cured rubber compositions of the invention prepared from a curable rubber composition containing natural rubber, nitrile rubber, zinc dimethacrylate, peroxide curing agent and co-curing agent. The curable rubber composition had the following formulation:

| Ingredients | Parts by weight |
| --- | --- |
| NR | 50.0 |
| nitrile rubber (50% ACN) | 50.0 |
| Zinc dimethacrylate | 70.0 |
| sodium dodecyl sulfate | 2.0 |
| Vulcup R | 1.75 |
| HVA-2 | 0.75 |
| Total | 174.50 |

The above formulation was mixed, cured and tested for stress-strain properties as in Examples 1-2. Curing conditions, test conditions and properties are shown in Table V.

TABLE V

| Cure Time, Min | 32 |
| --- | --- |
| Cure Temp, °C. | 160° C. |
| Stress-strain at 23° C. | |
| 10% modulus, MPa | 152 |
| Tensile, MPa | — |
| Elongation at break, % | 70 |

I claim:
1. Cured rubber compositions having modulii at 10% elongation of from about 50 MPa to about 200 MPa formed by curing, curable rubber compositions comprising:
 (a) 100 parts by weight of a rubber selected from the group consisting of natural rubber, nitrile rubber, neoprene and blends thereof;
 (b) from about 50 to about 100 parts by weight of a metal dimethacrylate selected from the group con- sisting of zinc dimethacrylate and magnesium dimethacrylate; and (c) from about 1.0 to about 6.0 parts by weight of a peroxide curing agent;

at temperatures ranging from about 140° to about 180° C. for time periods ranging from about 10 to about 45 minutes.

2. The cured rubber composition of claim 1 wherein said curable rubber composition further comprises from about 0.1 to about 2.0 parts by weight of a co-curing agent.

3. The cured rubber composition of claim 1 wherein the rubber of the curable rubber composition is natural rubber.

4. The cured rubber composition of claim 1 wherein the rubber of the curable rubber composition is nitrile rubber.

5. The cured rubber composition of claim 1 wherein the rubber of the curable rubber compostion is a blend of natural rubber and nitrile rubber.

6. The cured rubber composition of claim 1 wherein the metal dimethacrylate of the curable rubber composition is zinc dimethacrylate.

7. The cured rubber composition of claim 1 wherein the peroxide curing agent of the curable rubber composition is bis-(t-butyl peroxy) diisopropyl benezene.

8. The cured rubber composition of claim 1 wherein the co-curing agent of the curable rubber composition is selected from the group consisting of N,N'-meta-phenylene dimaleimide, triallyl isocyanurate, and mixtures thereof.

9. A method for preparing a cured rubber composition having a modulus at 10% elongation of from about 50 MPa to about 200 MPa comprising the steps of:

(1) preparing a curable rubber composition which comprises:

(a) 100 parts by weight of a rubber selected from the group consisting of natural rubber, nitrile rubber, neoprene and blends thereof;

(b) from about 50 to about 100 parts by weight of a metal dimethacrylate selected from the group consisting of zinc dimethacrylate and magnesium dimethacrylate; and (c) from about 1.0 to about 6.0 parts by weight of a peroxide curing agent; and (2) curing said curable rubber composition at temperatures ranging from about 140° C. to about 180° C. for time periods ranging from about 10 to about 45 minutes.

10. The method of claim 9 wherein the curable rubber composition prepared in step (1) further comprises from about 0.1 to about 2.0 parts by weight of a co-curing agent.

11. The method of claim 9 wherein the rubber of the curable rubber composition is natural rubber.

12. The method of claim 9 wherein the rubber of the curable rubber composition is nitrile rubber.

13. The method of claim 9 wherein the rubber of the curable rubber composition is a blend of natural rubber and nitrile rubber.

14. The method of claim 9 wherein the metal dimethacrylate of the curable rubber composition is zinc dimethacrylate.

15. The method of claim 9 wherein the peroxide curing agent of the curable rubber composition is bis-(t-butyl peroxy) diisopropyl benezene.

16. The method of claim 10 wherein the co-curing agent of the curable rubber composition is selected from the group consisting of N,N'-meta-phenylene dimaleimide, triallyl isocyanurate and mixtures thereof.

* * * * *